Feb. 2, 1971   T. D. DUDDERAR ET AL   3,559,461
APPARATUS AND METHOD FOR TENSION-COMPRESSION TESTING OF WIRE
Filed Sept. 17, 1969
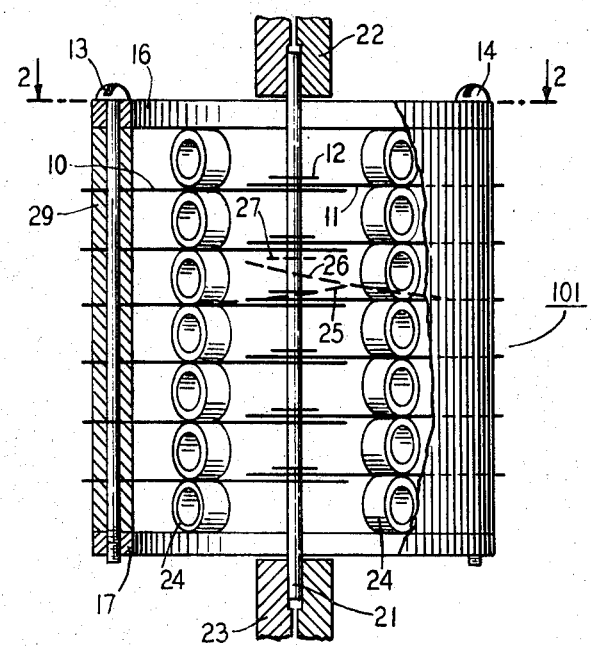
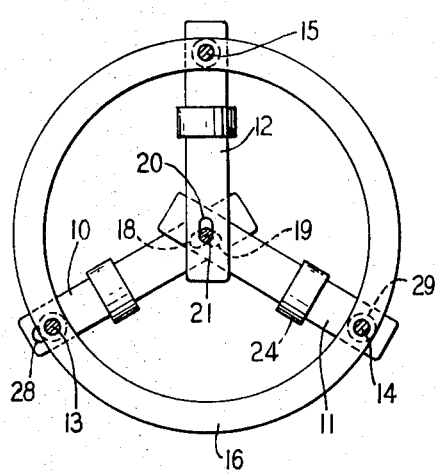
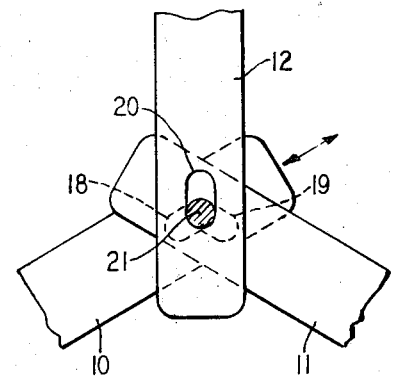
INVENTORS  T. D. DUDDERAR
A. FOX
G.F.H. WEISSMANN
BY
ATTORNEY

United States Patent Office 3,559,461
Patented Feb. 2, 1971

3,559,461
APPARATUS AND METHOD FOR TENSION-COMPRESSION TESTING OF WIRE
Thomas D. Dudderar, Madison, Alfred Fox, Parsippany, and Gerd F. H. Weissmann, Florham Park, N.J., assignors to Bell Telephone Laboratories, Incorporated, Murray Hill, N.J., a corporation of New York
Filed Sept. 17, 1969, Ser. No. 858,798
Int. Cl. G01n 3/32
U.S. Cl. 73—92         10 Claims

ABSTRACT OF THE DISCLOSURE

A number of thin strips of metal or flexbars are used to eliminate buckling of a wire and permit compressive stress-strain testing such as encountered in cyclic fatigue testing. The flexbars are essentially beams whose axes of symmetry coincide with radii of a cylinder. The flexbars are mounted around the periphery of the cylinder and overlap at the center. The wire to be tested passes through a hole into each flexbar along the axis of the cylinder. The flexbars are spaced at some distance less than the critical length for buckling for the wire and are adjusted to apply a small lateral force to the wire in various directions in planes normal to the wire axis and along the flexbar axes. Thus, the wire is kept from buckling under axially applied compressive forces. The thin flexbars offer negligible resistance to lateral or axial expansion or contraction of the wire.

BACKGROUND OF THE INVENTION (1) Field of the invention

This invention relates to apparatus for tension-compression testing of material and more particularly to apparatus and methods for tension-compression testing of wire.

(2) Description of the prior art

Many important mechanical properties of wire can best be determined by uniaxial tension-compression or compression testing. A typical case would be the determination of the low cycle fatigue behavior at zero mean stress. There are several methods presently available for determining the fatigue properties of wire by rotating or repeated bending. These methods are not as desirable as a uniaxial push-pull fatigue test, however, because of the nonuniform stress distribution in bending. Thus, it is very desirable to conduct such tests as a uniaxial push-pull fatigue test.

A major problem, however, in conducting uniaxial tension-compression tests is the tendency of the wire to buckle, or fail from structural instability, under very small compressive forces. Attempts to prevent buckling of the wire sample by making its length less than the critical length for buckling merely introduce additional problems. When the wire sample is very short, end effects and poor axial alignment of the sample may introduce sizable errors in the test results. Thus it is desirable to utilize long specimens which are prevented from buckling in order to eliminate errors introduced by end effects.

The methods and apparatus utilized for axial tension-compression testing of thin sheets of material are not suitable for testing wire because the wire has no preferred direction of buckling as does a thin sheet of material. Additionally, the presently-used methods and apparatus for testing thin sheets introduce friction forces and significant contact forces between the apparatus and the test specimen which cause errors in test results.

Accordingly, it is an object of this invention to improve the capability of wire-testing apparatus to perform uniaxial tension-compression testing of wire.

Another object of the invention is to simplify the apparatus for making uniaxial tension-compression tests of wire to make such apparatus useful as production testing apparatus.

SUMMARY OF THE INVENTION

The foregoing objects and others are achieved in accordance with the principles of the invention through the use of a number of thin flexbars to support the wire being tested. The thin flexbars are essentially cantilever beams whose axes of symmetry coincide with radii of a cylinder. They are mounted around the periphery of the cylinder and overlap at the center of the cylinder. The wire to be tested passes through a hole in each flexbar along the axis of the cylinder. The flexbars are spaced along the wire at some distance less than the critical length for buckling of the particular wire sample. The flexbars are adjusted to apply a very small lateral force to the wire perpendicular to its axis in various directions along the radii of the cylinder. Thus the wire is prevented from buckling when an axial compressive force is applied. The flexbars are extremely thin and thus have negligible stiffness in a direction parallel to the compressive force. Therefore the flexbars move or deflect with the wire in this direction and negligible friction and resistance to lateral expansion is generated between the flexbars and wire. The apparatus may be utilized with the commonly-used testing machines such as universal testing machines or axial load fatigue machines.

BRIEF DESCRIPTION OF THE DRAWING

The invention may be more fully comprehended from the following detailed description and accompanying drawing in which:

FIG. 1 is an elevation view of the apparatus of the invention;

FIG. 2 is a view along direction 2—2 of FIG. 1; and

FIG. 3 is an enlarged view of the center portion of FIG. 2.

DETAILED DESCRIPTION

As shown in FIG. 1 the apparatus 101 of this invention comprises three groups of flexbars of which flexbars 10, 11 and 12 shown more fully in FIG. 2 are typical. The flexbars 10, 11 and 12 are mounted on support columns or rods 13, 14 and 15 respectively around the periphery of the apparatus which is essentially cylindrical in configuration in the illustrative embodiment. The columns 13, 14, and 15 are mounted between two retaining rings 16 and 17, and are separated by approximately 120 degrees. At least one group of flexbars, of which flexbar 10 is typical, is adjustable in position along a radius of the apparatus 101. This is best accomplished by installing the support column 13 in a slot arrangement such as slot 28 in the flexbar 10. The adjustment allows the flexbar 10 to be moved radially in the apparatus. Alternately, the support column could be mounted in slots in the retaining rings 16 and 17. Each flexbar 10, 11 and 12 has a hole 18, 19 and 20, respectively, in one end thereof which overlaps or intersects along the central axis of the apparatus 101 with the hole in every other flexbar. The wire 21 to be tested passes through each of the holes along the center of the apparatus. The amount of overlap of the holes, i.e., the size of the hole through which the wire 21 passes, may be adjusted by adjusting the position of support column 13 thereby moving one group of flexbars radially in or out as previously disclosed.

When a wire 21 is inserted in the apparatus 101, the support column is adjusted, i.e., the overlap is made smaller, so that the wire 21 is contacted by the edge of holes 18, 19 and 20. Thus negligible tension forces are applied to the wire 21 perpendicular to its axis in three directions approximately 120 degrees apart to keep the wire stable when a uniaxial compressive force is applied to the wire 21. The ends of the wire 21 exiting the apparatus 101 on each end are inserted into the grips 22 and 23 of an appropriate test machine.

The flexbars are spaced along the wire at some distance less than the critical length for buckling of the wire. The critical length for buckling depends on such factors as wire size and material. Spacers, of which spacer 24 is typical, are used to maintain the appropriate flexbar separation near the test wire 21. Spacer 24 can advantageously be a short section of appropriate rubber or plastic tubing. The separation of the flexbars along the support columns 13, 14 and 15 is maintained by other spacers of which spacer 29 is typical. The spacings of the flexbars are less than the critical length for buckling of any contemplated wire to be tested. Alternatively, the spacings of the flexbars may be made adjustable with respect to the columns 13, 14 and 15 and various sizes of spacers 24 and 29 could be utilized so that the spacings of the flexbars are more nearly optimized for each specific wire.

The overall length of the apparatus 101, and consequently the total number of flexbars, will depend on the length of the wire samples to be tested. As discussed previously, the sample length should be sufficient to eliminate the problem of end effects and axial alignment.

The flexbars are made of very thin spring material such as a thin copper-beryllium strip. Thus the flexbars act as a cantilever of negligible stiffness in a direction parallel to the wire 21. Lines 25, 26 and 27 show in somewhat exaggerated fashion how the flexbars deflect during axial elongation of the wire 21 under stress. This deflection of the flexbars under negligible force insures that there is no relative motion between the flexbars and the wire 21. Thus there is negligible friction force.

Various modifications could be made to the apparatus 101. For example, all groups of flexbars could be made adjustable in position by making their respective support columns adjustable. Different numbers of groups of flexbars could be utilized and different configurations and angular separations could be made. Therefore, it is to be understood that the embodiment shown herein is merely illustrative of the principles of the invention. Modifications thereto may be made without departing from the spirit and scope of the invention.

What is claimed is:

1. Apparatus for making tension-compression tests of a wire comprising, in combination, a multiple of restraining members having negligible stiffness in a direction parallel to said wire, each of said members having a hole in one end thereof overlapping said hole in every other said member, said wire passing through each of said holes, means for spacing said members along said wire at a distance less than the critical length for buckling of said wire, and means for adjusting said members to apply forces in multiple directions normal to the axis of said wire whereby said wire remains in a stable configuration when a compressive stress is applied along said axis.

2. Apparatus in accordance with claim 1 wherein each of said restraining members comprises a thin strip of metal.

3. Apparatus in accordance with claim 2 wherein said metal is copper-beryllium strip.

4. Apparatus in accordance with claim 1 wherein said multiple of restraining members comprises first, second and third series of flexbars, each of said series of flexbars being mounted around the periphery of a substantially cylindrical configuration at a substantially equal angular spacing from each of the other of said series.

5. Apparatus in accordance with claim 4 including first and second retaining rings between which said series of flexbars are mounted, and first, second and third support members connected between said retaining rings upon which said first, second and third series of flexbars are mounted respectively.

6. Apparatus in accordance with claim 5 wherein said first support member is adjustable in position with respect to said retaining rings whereby said overlap of said holes in the end of said flexbars may be adjusted thereby to apply tensile forces to said wire.

7. Apparatus in accordance with claim 5 wherein said spacing means comprises first means for separating said flexbars along said support member and second means for separating said flexbars along said wire whereby each flexbar remains substantially parallel to every other said flexbar.

8. Apparatus in accordance with claim 7 wherein said first and second separating means are adjustable in size whereby the spacing of said flexbars may be adjusted.

9. Apparatus in accordance with claim 8 wherein said separating means comprise cylindrical sections of plastic material.

10. The method of compressive stress-strain testing of wire comprising the steps of passing said wire through a multiple of thin support members each having a hole in one end thereof, said support members radiating from said wire in multiple direction, spacing said support members along said wire at a distance less than the critical length for buckling of said wire, adjusting the positions of said support members to apply a negligible tensile force to said wire along the direction of said support members, and applying a compression force to said wire parallel to the length thereof whereby the stress-strain characteristics of said wire in compression may be determined.

References Cited

UNITED STATES PATENTS 2,368,900   2/1945   Templin _____ 73—94

JERRY W. MYRACLE, Primary Examiner

U.S. Cl. X.R.

73—94